United States Patent
Takeuchi

(10) Patent No.: US 8,082,410 B2
(45) Date of Patent: Dec. 20, 2011

(54) ADDRESS EXCLUSIVE CONTROL SYSTEM AND ADDRESS EXCLUSIVE CONTROL METHOD

(75) Inventor: Hiroshi Takeuchi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 523 days.

(21) Appl. No.: 12/200,560

(22) Filed: Aug. 28, 2008

(65) Prior Publication Data

US 2009/0006784 A1    Jan. 1, 2009

Related U.S. Application Data

(63) Continuation of application No. PCT/JP2006/303796, filed on Feb. 28, 2006.

(51) Int. Cl.
*G06F 12/00* (2006.01)
(52) U.S. Cl. ........................ 711/163; 711/168
(58) Field of Classification Search ................ 711/163
See application file for complete search history.

(56) References Cited

U.S. PATENT DOCUMENTS

| 5,893,156 A * | 4/1999 | Matsumoto | 711/145 |
| 6,516,384 B1 * | 2/2003 | Clark et al. | 711/109 |
| 2004/0003021 A1 * | 1/2004 | Safford et al. | 709/104 |

FOREIGN PATENT DOCUMENTS

| JP | 3-196249 | 8/1991 |
| JP | 6-35866 | 2/1994 |
| JP | 8-286968 | 11/1996 |
| JP | 2000-3302 | 1/2000 |

OTHER PUBLICATIONS

International Search Report mailed on Nov. 21, 2006 in connection with International Application No. PCT/JP2006/303796.

* cited by examiner

*Primary Examiner* — Tuan Thai
*Assistant Examiner* — Ngoc Dinh

(57) ABSTRACT

An address lock register managing address exclusive control is made to retain not only an address but also a request type, an access destination, and a cache block. Upon receiving a new request, firstly, the address lock register is referred to judge whether an exclusive condition is satisfied, that is, whether an address match, CPU match, LINE match or SX-WAY match is present, and whether the address lock is busy in accordance with the output of an AND circuit. Further, the configuration is such that the address lock register is referred to confirm that the addresses are identical to each other, and, additionally, the response source is validated to be identical to a lock flag and the new request causing the lock is validated to be consistent with the response request upon receiving a response request so that the lock is not released unless a correct response is made.

8 Claims, 9 Drawing Sheets

ADDRESS EXCLUSIVE CONTROL SYSTEM AND ADDRESS EXCLUSIVE CONTROL METHOD

CROSS REFERENCE TO RELATED APPLICATION

This application is a continuation of PCT application of PCT/JP2006/303796, which was filed on Feb. 28, 2006.

BACKGROUND OF THE INVENTION

1. Field of the Invention

The present invention relates to an address exclusive control system and an address exclusive control method which enable a precise exclusive control related to a next request by retaining not only an address but also the type of a request and the destination of access in a register.

2. Description of the Related Art

FIG. 1 is a block diagram showing an outline configuration of a conventional address exclusive control system. Referring to FIG. 1, the conventional address exclusive control system comprises a first central processing unit (CPU) 1, a second CPU 2, a first input/output apparatus (IO) 3, a second IO 4, first main memory 5, second main memory 6, and a system controller (SC) 10. The system controller (SC) 10 is equipped with a new request reception function (A), an address lock judgment function (B), a request issue function (C), and a response request reception function (D).

FIG. 2 is a diagram showing a packet flow and an operation timing, both of which are for describing the operation of the conventional address exclusive control system when requesting a fetch. Referring to FIG. 2, a request for a fetch ("fetch request") from the first CPU (CPU0) 1 is received at the SC 10 and searched for. If it is indexed that the present fetch request is for the second CPU (CPU1), the SC 10 issues a read request to the second CPU 2 which then returns, to the SC 10, a response corresponding to the read request. The SC 10 returns the returned response to the first CPU 1 as the response corresponding to the fetch request. In this case, the SC 10 carries out an address lock, thereby executing an exclusive control so as not to allow an access to the same address designation, the address lock being carried out in the midst of a search after receiving a fetch request from the first CPU 1 followed by starting a search to find what apparatus a received fetch request is for and receiving the response of a read request from the second CPU 2.

FIG. 3 is a diagram showing a packet flow and an operation timing, both of which are for describing the operation of the conventional address exclusive control system when requesting a storing. Referring to FIG. 3, a request for storing ("store request") from the first CPU (CPU0) 1 is received at the SC 10 and searched for. If it is indexed that the present store request is to the first main memory (MEM0) 5, the SC 10 issues a store request to the first main memory 5 which then executes a memory store in response to the request and returns a response to the store request to the SC 10 upon completion of the memory store. In this case, the SC 10 carries out an address lock, thereby executing an exclusive control so as not to allow an access to the same address designation, the address lock being carried out in the midst of a search after receiving a store request from the first CPU 1 followed by starting a search to find what apparatus a received store request is for and completing a response to the store request from the first main memory 5.

FIG. 4 is a flow chart for describing the operation of the conventional address exclusive control system. Describing FIG. 4 by referring to the configuration shown in FIG. 1, the new request reception function (A) shown in FIG. 4 first receives a new request from a request source (e.g., a CPU, IO or the like) (step S1; also simply "S1" hereinafter). Then, the address lock judgment function (B) of the SC 10 searches for the address of the received request and judges whether or not an address lock is in effect, that is, whether or not the address included in the request matches the address retained in an address register (not shown in a drawing herein), thereby examining whether or not it is an "address lock match". The process for examining the existence of the address lock match is described in detail by referring to FIG. 5.

If it is an address lock match, the access of a new request is not permitted under an exclusive control and therefore the process returns to S2 for carrying out the process therein. If it is not an address lock match, the process proceeds to S3 in which the content of the new request is set to a register. Then, the request issue function (C) of the SC 10 issues a request to the correspondent (S4). In step S5, the request issued in S4 is received by any of the CPUs 1 and 2, IOs 3 and 4, and main memories 5 and 6. Then, a response-series request related to the process is returned from any of the CPUs 1 and 2, IOs 3 and 4, and main memories 5 and 6 that have received the request so that the response request reception function (D) of the SC 10 receives the response-series request (S6). In this event, the address lock judgment function (B) of the SC 10 compares the address included in the response-series request received by the response request reception function (D) with the address existing in an address lock register (not shown in a drawing herein), thereby examining whether or not it is an address lock match (S7; refer to FIG. 5). Then, if it is an address lock match, the process proceeds to S8 in which the address lock judgment function (B) resets the lock flag of the response destination and the process ends. In contrast, if it is not an address lock match, the process proceeds to S9 in which a protocol error is detected and the process ends.

FIG. 5 is a diagram describing the operation for examining an address lock match in the conventional address exclusive control system. Describing FIG. 5 by referring to the configuration shown in FIG. 1, the address lock judgment function (B) of the SC 10 shown in FIG. 5 compares the address included in the request 8 received by the new request reception function (A) of the SC 10 with the address retained in the address lock register 7 by means of an address match discernment function 9 and, if the addresses match each other as a result of the comparison, outputs the result as an address lock match (refer to reference patent document 1). Note that the above description is provided by referring to the request 8 as a new request; the description is the same if the request 8 is a response-series request.

The conventional address exclusive control system described above is configured to determine the area of an address that is to be locked by using only the address regardless of the kind or access destination of the preceding request. The determination of the area of an address that is to be locked by using only the address has been met with the problem of also locking unnecessary access destinations. Further, the locking of even an unnecessary access destination has conventionally disabled simultaneous accesses to a plurality of addresses, consequently generating the problem of degrading the performance of the entire system.

Furthermore, if a failure (e.g., a time OUT, et cetera.) occurs due to the exclusive control of the above described address exclusive control system, there has been the problem that it is difficult to identify the suspected location of the failure because no information other than that of the locked address is left.

Further, the failure in a response request occurs after the elapse of a certain period of time after the issuance of a corresponding new request, and therefore few pieces of information related to the new request are available, thus creating the problem that it is difficult to perform an investigation including the new request.

Patent document 1: Laid-Open Japanese Patent Application Publication No. H03-196249

SUMMARY OF THE INVENTION

The present invention is contrived to make an address lock register that manages an exclusive control of an address retain not only an address but also a request type, an access destination, and an SX (cache) block. The request type is the type of a signal output from a CPU, memory, or an input/output (IO). The access destination is the send-out destination of a request, that is, the CPU, memory, or IO. The SX block is a block identified by a WAY and a LINE. Upon receiving a new request, first, a system controller (SC) refers to the address lock register to judge whether an exclusive condition is met, that is, whether or not a busy address lock is present. If a busy address lock is not present, a new request is sent to a send-out destination. With this, the present invention eliminates the need to lock any access destination other than a necessary access destination and an SX block. As compared to the conventional technique requiring the entire system including CPU and IO to be locked, the operating efficiency of a system, such as data transfer efficiency, is improved a significant amount because another CPU can be used even if, for example, one CPU is locked. Further, when a response request related to a new request is received from the send-out destination, a correct response with a validation that the response source and a lock flag are identical to each other, that is, with a validation that the response from the send-out destination and the flag of the send-out destination retained by the SC are identical to each other and with a validation of the consistency between the locked new request and an address other than the address of the response request, in addition to a validation that the address matches by referring to the address lock register, makes it possible to comprehend that the lock period at the access destination is normally completed, and therefore the lock address of the send-out destination is removed from the address register. If there is no response, failure detection is initiated and therefore the lock destination address will not be removed from the address register.

The present invention is contrived to make it possible to send out a request if an access destination or an SX block is different even for the same address. This in turn enables an efficient execution of a data transfer between CPUs and from cache memory.

The present invention is contrived to process, on the basis of one register, an exclusive control related to a cache (SX) block-designated request to the CPU, an exclusive control related to an address-designated request to main MEM and/or IO, a protocol check for a response-series request of the CPU and main MEM and/or IO, and a report of a request completion to the issue source for releasing the identifier of the request, thereby enabling a drastic reduction of the overall material volume.

It is further contrived to make an address lock register, which manages the exclusive control of an address, retain not only the address and access destination but also the request type, so as to validate the consistency between a locked new request and a response request, and to return a failure judgment if there is no correct response, thereby enabling an easy investigation when a failure occurs and also enabling the identification of a possible cause of the failure via the hardware quickly detecting the error.

DESCRIPTION OF THE PREFERRED EMBODIMENT

The following is a description, in detail, of the preferred embodiment of the present invention by referring to the accompanying drawings.

Figure 1:
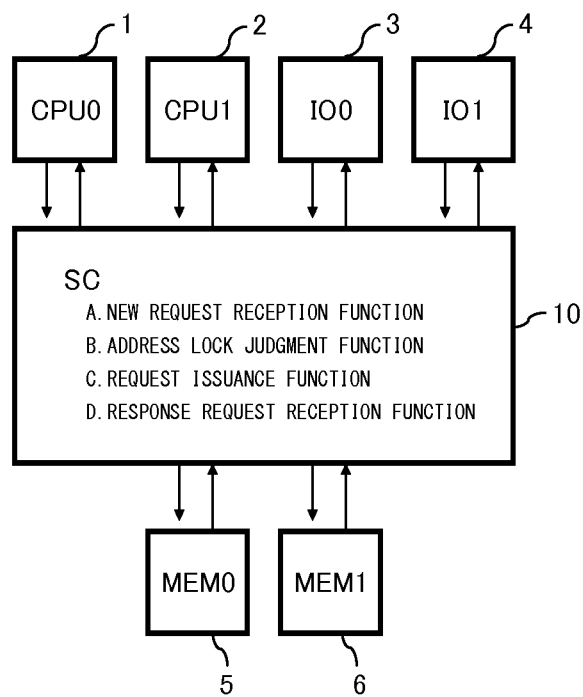
FIG. 1 is a block diagram showing an outline configuration of a conventional address exclusive control system.
Figure 2:
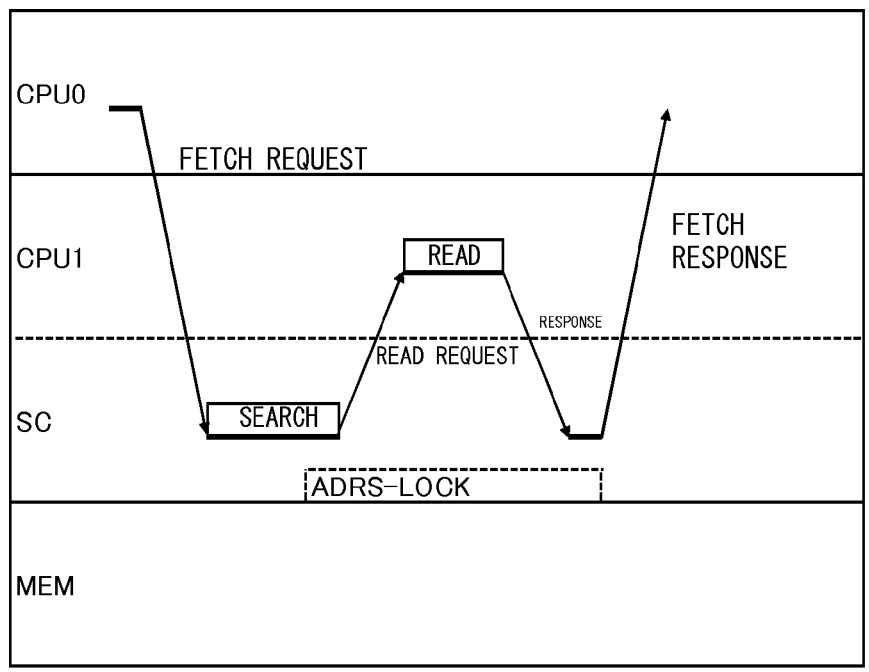
FIG. 2 is a diagram showing a packet flow and an operation timing, both of which are for describing the operation of the conventional address exclusive control system when requesting a fetch.
Figure 3:
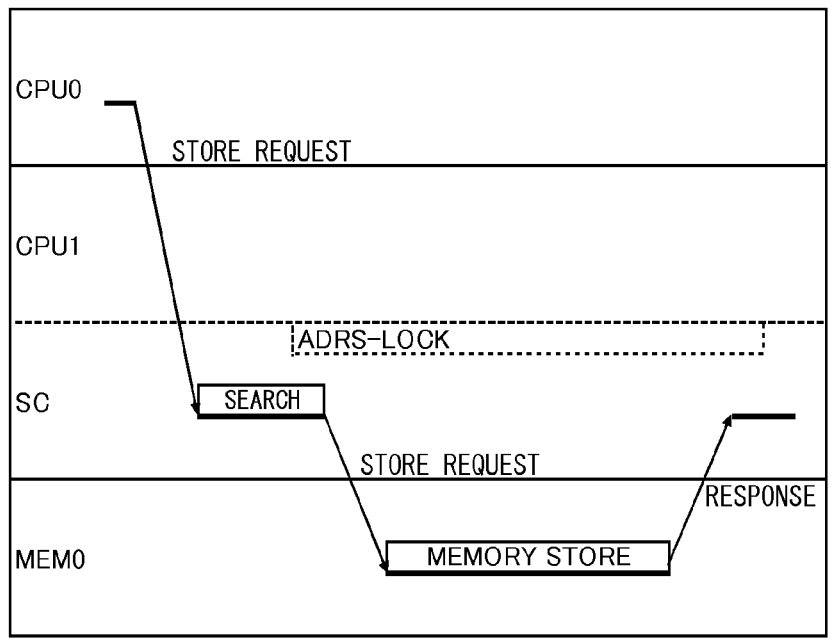
FIG. 3 is a diagram showing a packet flow and an operation timing, both of which are for describing the operation of the conventional address exclusive control system when requesting a storing.
Figure 4:
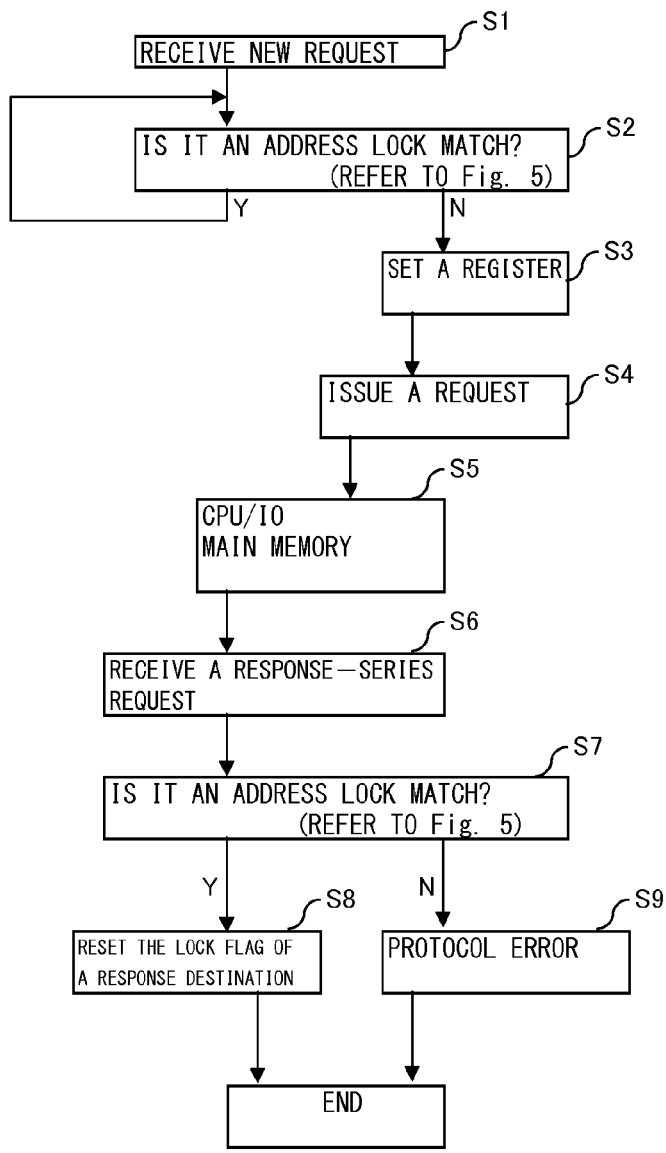
FIG. 4 is a flow chart for describing the operation of the conventional address exclusive control system.
Figure 5:
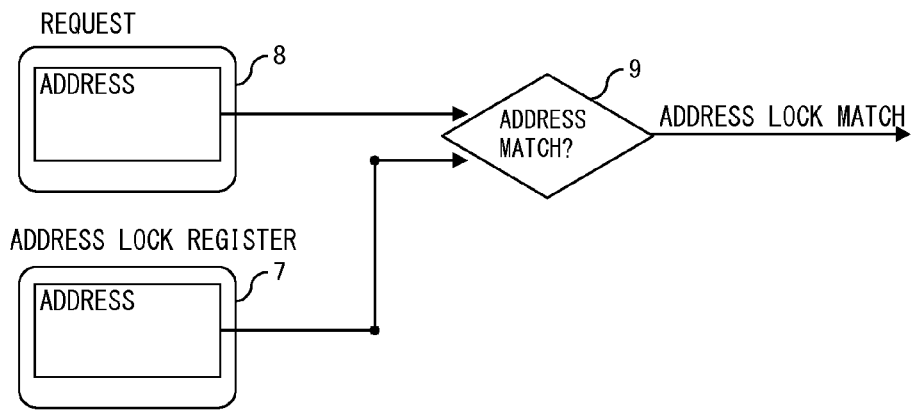
FIG. 5 is a diagram describing the operation for examining an address lock match in the conventional address exclusive control system.
Figure 6:
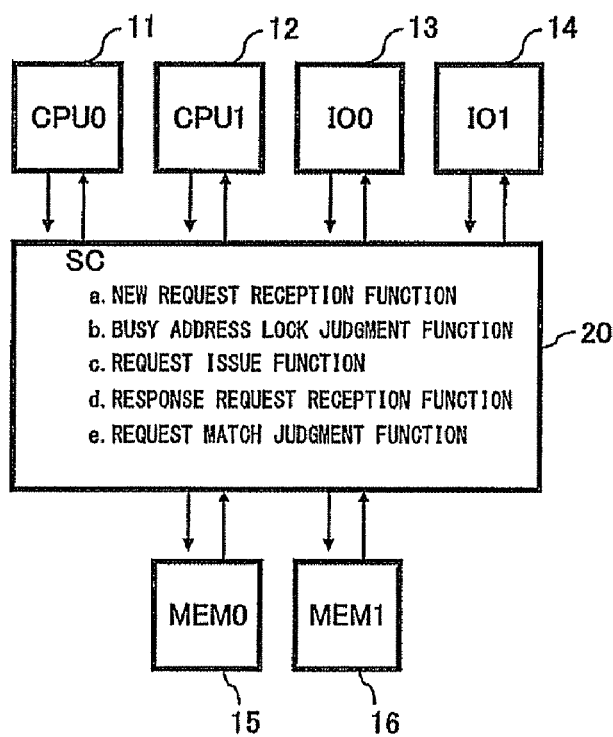
FIG. 6 is a block diagram showing an outline configuration of an address exclusive control system according to a preferred embodiment of the present invention.

FIG. 6 is a block diagram showing an outline configuration of an address exclusive control system according to the preferred embodiment of the present invention. Referring to FIG. 6, the address exclusive control system according to the embodiment of the present invention comprises a first central processing unit (CPU0) 11, a second CPU (CPU1) 12, a first input/output apparatus (IO0) 13, a second input/output apparatus (IO) 14, first main memory (MEM0) 15, second main memory (MEM1) 16, and a system controller (SC) 20. The system controller (SC) 20 comprises a new-request reception function (a), a busy address lock judgment function (b), a request issue function (c), a response request reception function (d), and a request match judgment function (e).

The address exclusive control system according to the embodiment of the present invention is configured to comprise an address lock register, which manages an exclusive control of an address and in which not only an address but also a request type, an access destination, and a cache block are retained, within the SC 20 which enables accesses to plural CPUs, plural input/output apparatuses and plural pieces of main memory, thereby making it possible to perform a precise exclusive control related to a subsequent request, to send out a request if a destination is different even though the address is the same, and to perform the transfer of data between the CPUs and from the cache memory efficiently. Further, the system enables an easy investigation when a failure occurs and an identification of a possible cause of the failure via the hardware quickly detecting the failure.

Specifically explaining, the address exclusive control system according to the embodiment of the present invention is configured to make the address lock register (not shown in a drawing herein) equipped within the SC 20 take part in all request processes as noted in the following paragraphs (1) through (5). That is:

(1) An exclusive control related to an address-designated request to another CPU. In this case, an address exclusive control related only to the CPU of an access destination is carried out;

(2) An exclusive control related to a cache (SX) block-designated request to the CPU. In this case, an address exclusive control related only to the cache (SX) block of an access destination is carried out (note that an SX block is grasped by SX-WAY and LINE);

(3) An exclusive control related to an address-designated request to the main MEM and/or IO. In this case, an address exclusive control is carried out regardless of an access destination;

(4) A protocol check of the response-series request to the CPU, main MEM, and/or IO; and (5) A report of a request completion to an issue source for releasing the identifier (ID) of a request.

Figure 7:
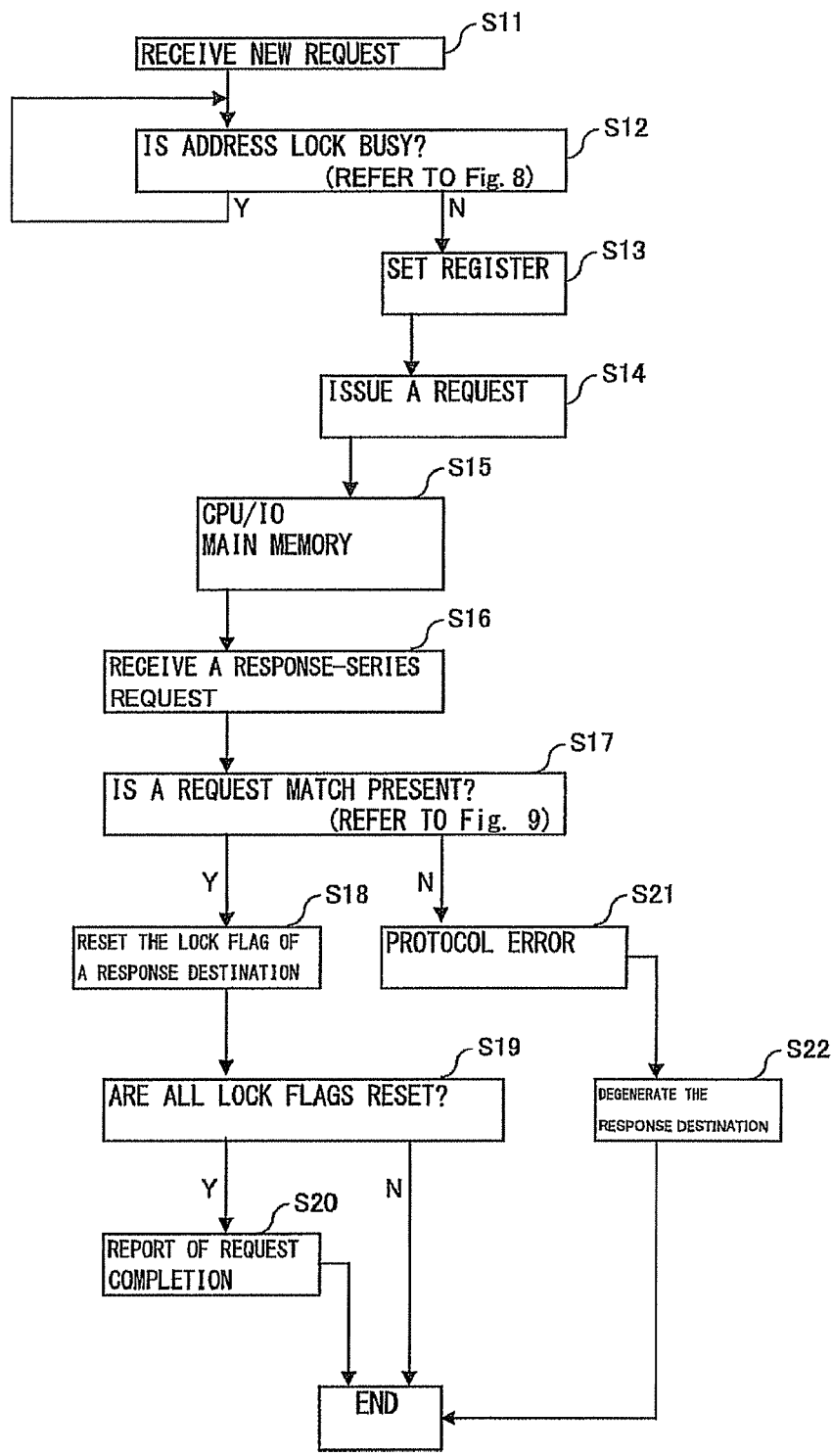
FIG. 7 is a flow chart for describing the operation of the address exclusive control system according to a preferred embodiment of the present invention.

FIG. 7 is a flow chart for describing the operation of the address exclusive control system according to the preferred embodiment of the present invention. Describing FIG. 7 by referring to the configuration of FIG. 6, first in FIG. 7, the new-request reception function (a) of the SC 20 receives a new request from a request source (e.g., a CPU and an IO) (step 11; also "S11" hereinafter). The busy address lock judgment function (b) of the SC 20 compares the received request content with the content retained in an address lock register (not shown in a drawing herein), judges an address match, a CPU match, a LINE match and SX (cache)-WAY match individually on the basis of a judgment as to whether or not a busy address lock is present, that is, a judgment as to which of the above paragraphs (1) through (3) the address designation is related to, in accordance with the request type. If there is a match output as a result of the judgment, the busy address lock judgment function (b) further performs a logic operation between an address match and a CPU match, and between a LINE match and an SX (cache)-WAY match; and, if there is an address match, further performs a logic operation with a store lock identifier retained in the address lock register and examines the presence of a busy address lock by searching the results of the respective logic operations (S12). The process for examining the presence of a busy address lock is described in detail by referring to FIG. 8.

If a busy address lock is present as a result of the examination, an exclusive control is in progress in which an access is not permissible for a new request so the process accordingly returns to S12 for repeating the process for the step. If a busy address lock is not present as a result of the examination, the process proceeds to S13 in which the content of the new request is set to the register. Then, the request issue function (c) of the SC 20 issues a request to the correspondent (S14). Then the request issued in S14 is received by any of the CPUs 11 and 12, IOs 13 and 14, and main memories 15 and 16 of the correspondent in S15. Then, a response-series request related to the process is returned from any of the CPUs 11 and 12, IOs 13 and 14, and main memories 15 and 16 that have received the request so that the response request reception function (d) of the SC 20 receives the response request (S16).

The request match judgment function (e) of the SC 20 compares the received response-series request with the content retained in the address lock register and judges an address match, a CPU match, a MEM (main memory) match and a protocol match individually on the basis of a judgment as to whether or not a request match is present, that is, a judgment as to which of the above paragraphs (1) through (4) the address designation is related to, in accordance with the response request type.

If there is an output in either the CPU match or the MEM match as a result of the judgment, the request match judgment function (e) performs a logic product operation between the output of either match, an address match output, and a protocol match output, thereby examining the presence of a request match by searching for the existence of the output of the aforementioned logical operation (S17). The process for examining the presence of a request match is described in detail by referring to FIG. 9.

If a request match is present as a result of the examination, the process proceeds to S18 in which the lock flag of the response destination is reset. Then in S19, whether or not all lock flags have been reset is judged. If all of them have been reset, a report of request completion is sent to the request source for releasing the identifier (ID) of a request related to the above paragraph (5) (S20), and the process ends. In contrast, if any of the lock flags has not been reset, the process ends as an incompletion of the request process.

In the meantime, if a request match is not present as a result of the examination in S17, the process proceeds to S21 in which a protocol error is detected. Then the degeneration of the response destination is carried out for preventing the error from spreading.

Figure 8:
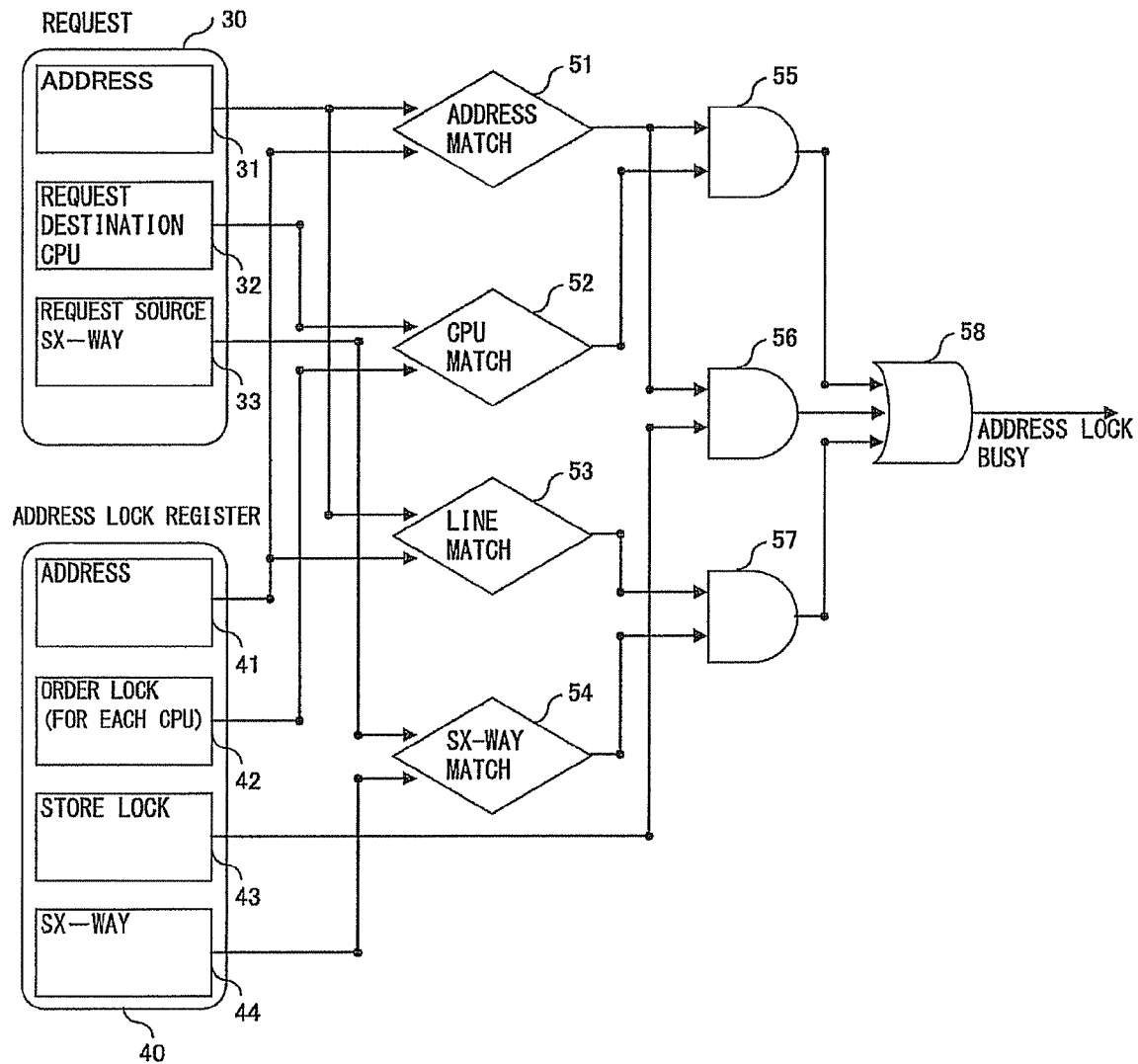
FIG. 8 is a diagram describing an operation for examining a busy address lock according to a preferred embodiment of the present invention.

FIG. 8 is a diagram describing an operation for examining a busy address lock according to the preferred embodiment of the present invention. Describing FIG. 8 by referring to the configuration shown in FIG. 6, the busy address lock judgment function (b) of the SC 20 shown in FIG. 8 compares, by means of an address match discernment function 51, the address 31 included in the new request 30 received by the new-request reception function (a) of the SC 20 with an address 41 retained in the address lock register 40, and outputs an output to logic product circuits 55 and 56 if the aforementioned two addresses are found to be identical to each other in the comparison.

The busy address lock judgment function (b) further compares, by means of a CPU match discernment function 52, a request destination CPU identifier 32 included in the new request 30 with an order lock identifier (ID) 42 (for each CPU) retained within the address lock register 40 and outputs an output to the logic product circuit 55 if the aforementioned two identifiers are found to be identical to each other in the comparison.

The busy address lock judgment function (b) further compares, by means of a LINE match discernment function 53, an address 31 included in the new request 30 with an address 41 retained in the address lock register 40 and outputs an output if the aforementioned two addresses are found to be identical to each other in the comparison.

The busy address lock judgment function (b) further compares, by means of an SX-WAY match discernment function, a request source SX-WAY 33 included in the new request 30 with the SX-WAY 44 retained within the address lock register 40 and outputs an output if the aforementioned two SX-WAYs are found to be identical to each other in the comparison.

Meanwhile, a store lock identifier 43 retained in the address lock register 40 is output to the logic product circuit 56 and a logic product is taken between the store lock identifier 43 and the output of the address match discernment function 51.

Then, if at least one output is obtained from the logic product circuits operations in the logic product circuits 55, 56 and 57, an output from the lower stage logic sum circuit 58 is obtained and the output constitutes an indication of a busy address lock.

Figure 9:
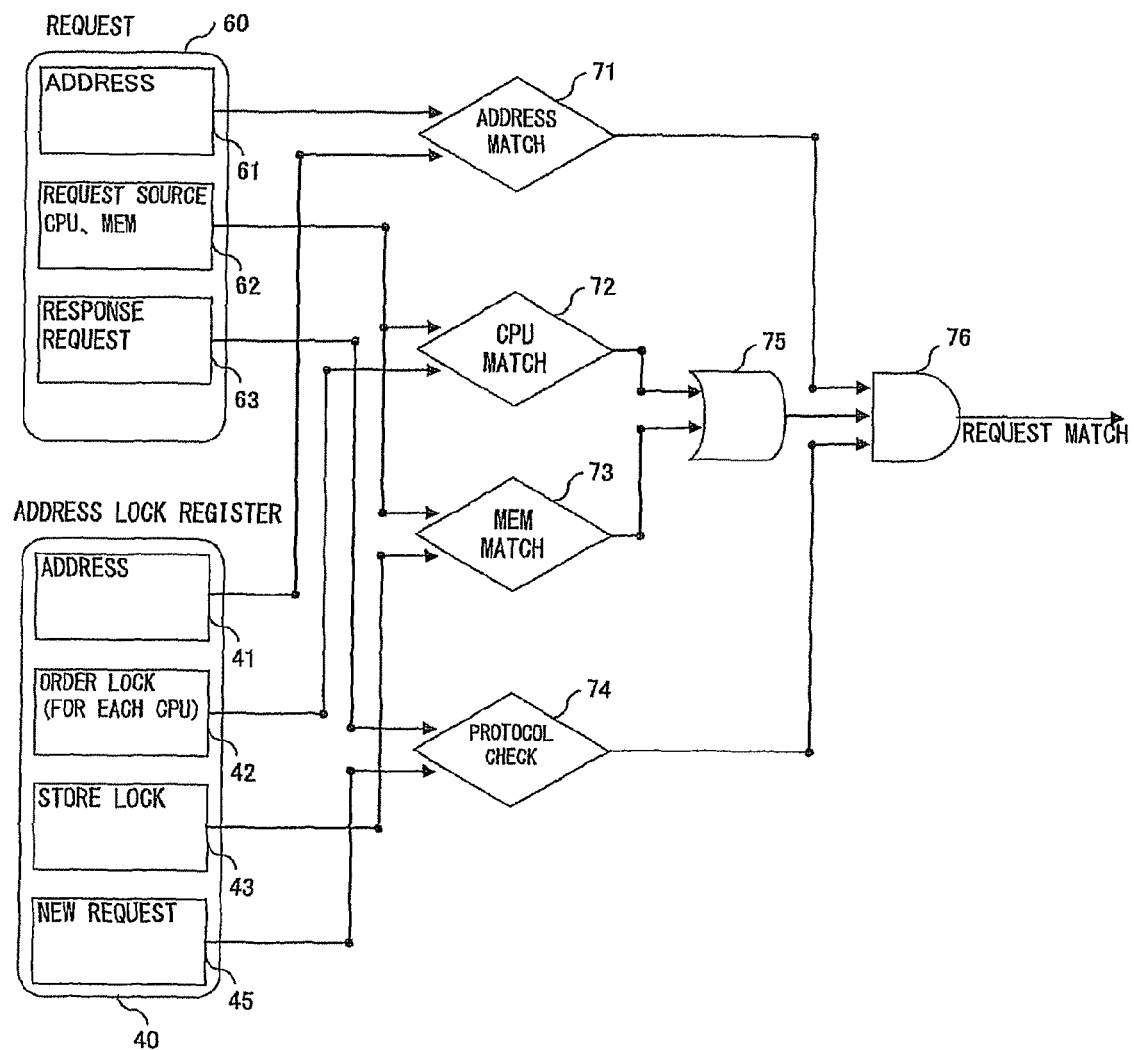
FIG. 9 is a diagram describing an operation for examining a request match according to a preferred embodiment of the present invention.

FIG. 9 is a diagram describing an operation for examining a request match according to the preferred embodiment of the present invention. Describing FIG. 8 by referring to the configuration shown in FIG. 6, the request match judgment function (e) compares, by means of an address match discernment function 72, a request source CPU identifier 62 included in the response request 60 with the order lock identifier (ID) 42 (for each CPU) retained in the address lock register 40 and outputs an output to a logic sum circuit 75 if the aforementioned two identifiers are found to be identical to each other in the comparison. The logic sum circuit 75 outputs an output to a logic sum circuit 76 if there is an input to the former.

Further, the request match judgment function (e) compares, by means of a MEM match discernment function 73, the request source CPU identifier 62 included in the response request 60 with the store lock identifier 43 retained within the address lock register 40 and outputs an output to the logic sum circuit 75 if the aforementioned two identifiers are found to be identical to each other in the comparison. The logic sum circuit 75 outputs an output to a logic product circuit 76 if there is an input to the former.

Further, the request match judgment function (e) compares, by means of a protocol check function 74, a response request identifier 63 included in the response request 60 with a new request identifier 45 retained in the address lock register 40 and outputs an output to the logic product circuit 76 if the aforementioned two identifiers are found to be identical to each other in the comparison.

Then, if inputs are present to all of the logic product circuits 76 and if an output is obtained from the logic product operation, the output constitutes an indication of a request match. In other words, the configuration is such as to release the lock only if there is a correct response request.

APPLICABILITY TO INDUSTRY

The above description has been described by exemplifying an application to a system controller (SC); the present invention, however, is applicable to other controllers such as a memory controller and the like in lieu of being limited to the application described above.

What is claimed is:

1. An address exclusive control system, comprising:
a register, within a system controller, for retaining an address, a request type, an access destination and a cache block, the system controller enables accesses to plural central processing units (CPUs), an input/output apparatus and plural memory, wherein
the system controller refers to a corresponding item of the register in accordance with the type of a new request, when the new request is received from one of the CPUs,
the system controller searches whether or not an address exclusive control is in progress, on a basis of a busy address lock judgment function which compares an address, a CPU identifier or a cache block included in the new request with the address, a CPU identifier or the cache block retained in the register, respectively,
the system controller carries out, if the address exclusive control is not in progress, the address exclusive control for another CPU in the CPUs, and
the system controller issues the request to the another CPU.

2. The address exclusive control system according to claim 1, wherein the type of said new request is any of an address designation to the other CPU, a cache block designation to the one CPU, an address designation to main memory and/or the input/output apparatus.

3. The address exclusive control system according to claim 2, wherein
the system controller carries out address exclusive controls for only the one CPU as an access destination and for only the cache block as the access destination if the type of said new request is the address designation to said other CPU and the cache block designation to said one CPU, and
the system controller carries out an address exclusive control regardless as the access destination if the type of the new request is the address designation to the main memory and/or input/output apparatus.

4. The address exclusive control system according to claim 1, comprising:
means for validating that the address of a response request matches an address retained in said register by referring to the register when the response request is received,
means for validating that a response source and a lock flag are identical to each other, and
means for validating consistency between said locked new request and the response request, wherein
a lock is not released unless the response request is validated as true by the aforementioned all means.

5. The address exclusive control system according to claim 4,
checking whether or not all of said lock flags are released and reporting the request completion to an issue source if all of lock flags are released.

6. An address exclusive control method, comprising the processes for
referring to the corresponding item of a register retaining an address, a request type, an access destination and a cache block in accordance with the type of a new request, when the new request from one CPU in the CPUs
searching whether or not an address exclusive control is in progress, on a basis of a busy address lock judgment function which compares an address, a CPU identifier or a cache block included in the new request with the address, a CPU identifier or the cache block retained in the register, respectively,
carrying out the address exclusive control for another CPU in the CPUs if the address exclusive control is not in progress as a result of the searching, and
issuing a request to the other CPU.

7. The address exclusive control method according to claim 6, comprising the processes for
validating that the address of a response request matches an address retained in said register by referring to the register when the response request is received,
validating that a response source and a lock flag are identical to each other,
validating consistency between said locked new request and the response request, and
releasing a lock if the response request is validated as true in the entire processes of the validation.

8. The address exclusive control method according to claim 7,
checking whether or not all of said lock flags are released and reporting the request completion to an issue source if all of lock flags are released.

* * * * *